(12) United States Patent
Lu et al.

(10) Patent No.: US 7,484,077 B2
(45) Date of Patent: Jan. 27, 2009

(54) SKIPPING UNNECESSARY INSTRUCTION BY MULTIPLEX SELECTOR USING NEXT INSTRUCTION OFFSET STRIDE SIGNAL GENERATED FROM INSTRUCTIONS COMPARISON RESULTS

(75) Inventors: Yen-Ju Lu, Taipei (TW); Yu-Ming Chang, Sinjhuang (TW)

(73) Assignee: Realtek Semiconductor Corp., Hsinchu (TW)

( * ) Notice: Subject to any disclaimer, the term of this patent is extended or adjusted under 35 U.S.C. 154(b) by 92 days.

(21) Appl. No.: 11/594,136

(22) Filed: Nov. 8, 2006

(65) Prior Publication Data

US 2007/0118722 A1 May 24, 2007

(30) Foreign Application Priority Data

Nov. 10, 2005 (TW) .............................. 94139351 A
Jan. 3, 2006 (TW) .............................. 95100241 A
Mar. 16, 2006 (TW) .............................. 95108897 A

(51) Int. Cl.
G06F 9/32 (2006.01)

(52) U.S. Cl. ........................................ 712/205; 712/245

(58) Field of Classification Search ........................ None
See application file for complete search history.

(56) References Cited

U.S. PATENT DOCUMENTS

| | | | |
|---|---|---|---|
| 5,852,741 A | 12/1998 | Jacobs et al. | |
| 5,862,398 A | 1/1999 | Hampapuram et al. | |
| 5,878,267 A | 3/1999 | Hampapuram et al. | |
| 5,893,143 A | 4/1999 | Tanaka et al. | |
| 6,131,152 A | 10/2000 | Ang et al. | |
| 6,195,743 B1 | 2/2001 | Elnozahy | |
| 6,199,126 B1 | 3/2001 | Auerbach et al. | |
| 6,216,223 B1 | 4/2001 | Revilla et al. | |
| 6,233,674 B1 | 5/2001 | Elnozahy | |
| 6,442,680 B1 | 8/2002 | Elnozahy | |
| 6,732,256 B2 | 5/2004 | Henkel et al. | |
| 6,859,870 B1 | 2/2005 | Kim et al. | |
| 6,892,292 B2 | 5/2005 | Henkel et al. | |
| 2004/0024990 A1* | 2/2004 | Chauvel et al. | ............. 712/209 |

OTHER PUBLICATIONS

M. Kozuch et al. Department of Electrical Engineering, Princeton University, Compression of Embedded System Programs pp. 270-277 (1994).

A. Wolfe et al. Department of Electrical Engineering, Princeton University, Executing Compressed Programs on An Embedded RISC Architecture pp. 81-91 (1992).

C. Lefurgy et al. EECS Department, University of Michigan, Reducing Code Size with Run-time Decompression.

N. Mahapatra et al., Department of Computer Science and Engineering., University of Buffallo, The Potential of Compression to Improve Memory System Performance, Power Consumption, and Cost.

* cited by examiner

*Primary Examiner*—Kenneth S Kim
(74) *Attorney, Agent, or Firm*—Muncy, Geissler, Olds & Lowe, PLLC

(57) ABSTRACT

The present invention discloses an apparatus for removing unnecessary instruction and method thereof. The apparatus and operating method thereof include: a comparing circuit for comparing a plurality of instructions and a predetermined pattern, so as to generate a plurality of comparing signals; a control logic for generating an instruction-selecting signal and a stride signal according to the plurality of comparing signals; and a multiplexer for receiving the plurality of instructions and outputting at least one of the received instructions to a processing unit according to the instruction-selecting signal. Furthermore, the processing circuit processes the instruction outputted by the multiplexer according to the stride signal.

23 Claims, 15 Drawing Sheets

US 7,484,077 B2

SKIPPING UNNECESSARY INSTRUCTION BY MULTIPLEX SELECTOR USING NEXT INSTRUCTION OFFSET STRIDE SIGNAL GENERATED FROM INSTRUCTIONS COMPARISON RESULTS

BACKGROUND OF THE INVENTION

1. Field of the Invention

The present invention relates to a method and apparatus of removing unnecessary instructions, and more particularly, to a method and apparatus of removing unnecessary instructions utilized in a computer system.

2. Description of the Related Art

Under the reduced instruction set computer (RISC) structure, all instructions are designed to have the same length and a more simplified format. Therefore, the design rule of the processor and compiler under the reduced instruction set computer structure can be simplified accordingly.

However, in contrast to complicated instruction set computer (CISC) structure, the above-mentioned RISC structure has the disadvantages of more program codes and lower efficiency. Therefore, the program codes of the RISC structure are often compressed to reduce the requirement of the storage space of the memory.

But, the position of the instruction of the compressed program codes is not the same as that of the original program codes. Therefore, the most essential point of the compressing and decompressing technique is to find out the correct position of the instruction from the compressed program codes. To speak more specifically, the compressed program should be decompressed along with the execution flow of the program such that the program can be decompressed into correct program pieces to be executed in the correct time. If the entire program is decompressed before the program is executed, the benefit of decompressing the instruction codes is reduced. On the other hand, if the correct positions of instructions should be directly discovered from the decompressed program codes, the most-widely-used method is to build an index. The index stores the corresponding relationships between the original addresses in instructions in the uncompressed program codes and the addresses in instructions in the compressed program codes.

Therefore, through using the index, the decompressing unit can correctly find out the positions of the instructions and further perform an appropriate decompression operation to generate correct instruction codes. Unfortunately, in order to deal with the above-mentioned index, not only a complicated index circuit is required, but also the cost increases accordingly.

Please note, the above-mentioned program codes compressing technique can be referred to the following papers or patents: "Andrew Wolfe and Alex Chanin, "Executing Compressed Programs on An Embedded RISC Architecture," in proc. Micro-25: The 25th Annual International Symposium on Microarchitecture, 1992.", U.S Pat. No. 6,732,256 "Method and apparatus for object code compression and decompression for computer systems", and U.S Pat. No. 6,892,292 "Apparatus for one-cycle decompression of compressed data and methods of operation thereof."

Furthermore, there is another well-known instruction code compressing method, which extends the instruction set. This method utilizes an additional extension instruction having a shorter length to replace an original instruction. It can be referred to U.S Pat. No. 6,195,743 "Method and system for compressing reduced instruction set computer (RISC) executable code through instruction set expansion".

In addition, other references includes U.S Pat. Nos. 6,199, 126, 6,233,674, 5,852,741, 5,862,398, 5,878,267, 5,893,143, 6,131,152, 6,216,223, 6,442,680, and 6,859,870, and papers including M. Kozuch and A. Wolfe. "Compression of Embedded System Programs" *IEEE International Conference on Computer Design: VLSI in Computers & Processors,* 1994, Haris Lekatsas and Wayne Wolf. "Code Compression for Embedded Systems" 35th Design Automation Conference 1998, Charles Lefurgy, Eva Piccininni and Trevor Mudge. "Reducing Code Size with Run-Time Decompression, and NIHAR R. MAHAPATRA, JIANGJIANG LIU, KRISHNAN SUNDARESAN, SRINIVAS DANGETI and BALAKRISHNA V. VENKATRAO. "The Potential of Compression to Improve Memory System Performance, Power Consumption, and Cost"

SUMMARY OF THE INVENTION

In view of the above-mentioned problems, an object of the invention is to provide a method and apparatus of removing unnecessary instructions to improve the efficiency of the computer system.

According to an embodiment of the present invention, an apparatus and a method for removing unnecessary instructions is disclosed. The apparatus and method comprise: a comparing circuit comprising a plurality of comparing units, for comparing a plurality of instructions with at least one predetermined pattern to generate a plurality of comparing signals; a control logic circuit, for generating an instruction-selecting signal and a stride signal according to the plurality of comparing signals; and a multiplexer, for receiving the plurality of instructions and the instruction-selecting signal and outputting at least one of the plurality of instructions according to the instruction-selecting signal; wherein the control logic circuit outputs the stride signal to a processing unit, and the processing unit processes the instruction outputted by the multiplexer according to the stride signal.

DETAILED DESCRIPTION OF THE INVENTION

The "TITLE" of the invention will be described with reference to the accompanying drawings.

Figure 1:
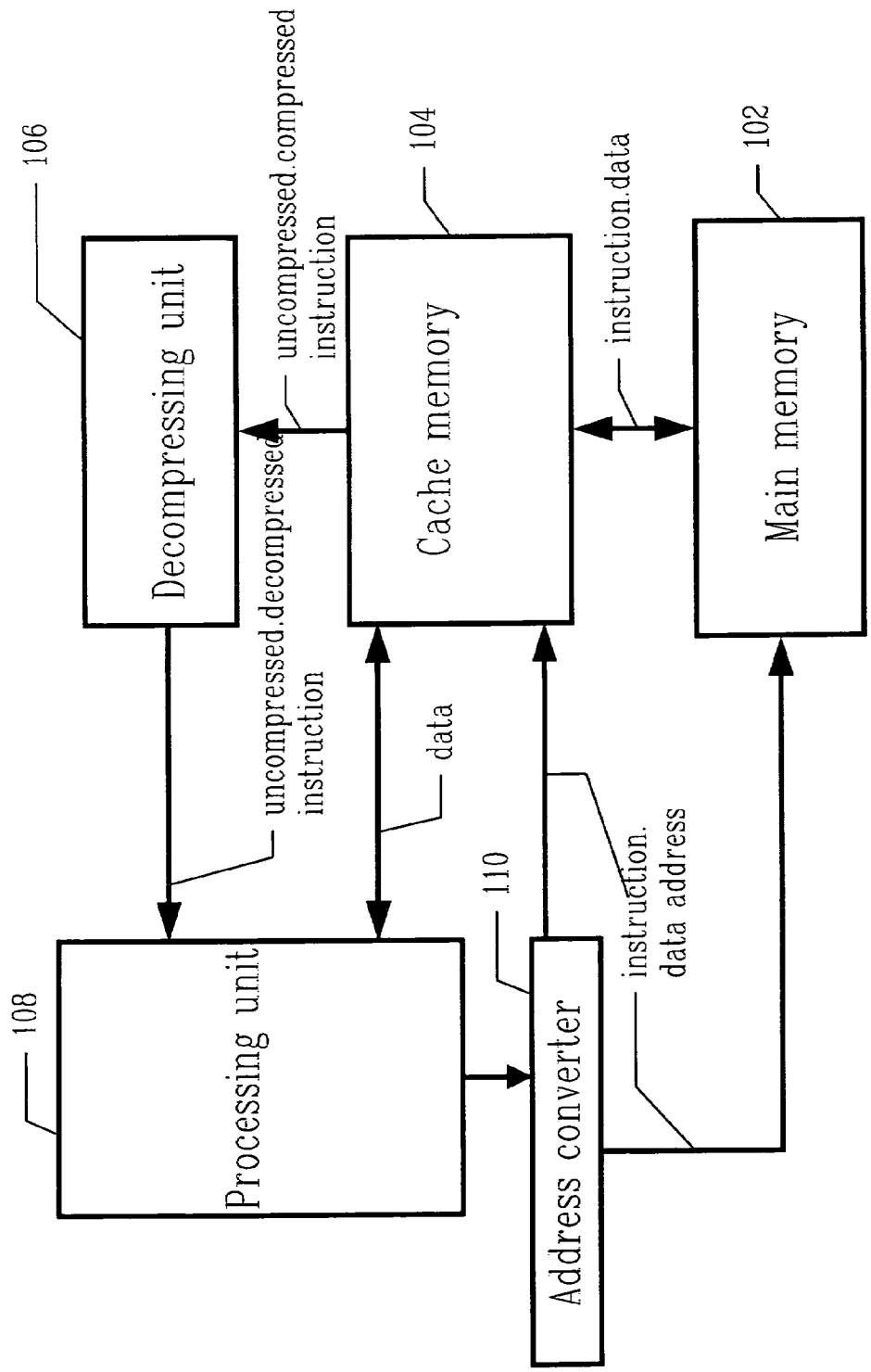
FIG. 1 is a functional block diagram of a computer system utilizing the technique according to the present invention.

Please refer to FIG. 1, which is a functional block diagram of a computer system 100 utilizing the technique according to the present invention. The computer system 100 comprises a main memory 102 for storing instructions and data, a cache memory 104 for storing cacheable instructions and data, a decompressing unit 106 for receiving uncompressed/compressed instructions transferred from the cache memory 104 and decompressing the compressed instructions, a processing unit 108 for receiving uncompressed/decompressed instructions transferred from the decompressing unit 106 and processing the data transferred from the cache memory 104, and an address converter 110 for converting the addresses transferred from the processing unit 108 into corresponding addresses in the main memory 102 or the cache memory 104.

When the processing unit 108 needs a certain instruction, an instruction address is outputted to the address converter 110. The address converter 110 converts the instruction address into a corresponding address in the cache memory 104 or in the main memory 102. If the cache memory 104 stores the instruction corresponding to the above-mentioned corresponding address, the processing unit 108 then directly obtains the needed instruction from the cache memory 104. On the other hand, if the cache memory 104 does not store the instruction corresponding to the above-mentioned corresponding address, the processing unit 108 reads needed instruction or data from the main memory 102.

Because the uncompressed instructions occupy more storage spaces of the main memory 102 or the cache memory 104, the present invention can compress the instructions and then store the compressed instructions into the main memory 102 or the cache memory 104. Therefore, the present invention can store more instructions into the main memory 102 and the cache memory 104. Furthermore, for a given bus bandwidth, when the instructions, stored inside the main memory 102, are being read, if the instructions have been compressed, the read efficiency is better.

Moreover, the present invention discloses a novel method of compressing the instructions such that instruction blocks (such as instruction blocks under the RISC structure) having a certain length (such as the cache line size) can be compressed into instruction blocks having a specific compression ratio.

Through the aforementioned specific compression ratio, when the processing unit 108 has to read an instruction of a certain address, the address converter 110 can be utilized to calculate the corresponding address inside the main memory 102 or the cache memory 104 where the corresponding compressed instruction is located. Therefore, the processing unit 108 can read the compressed instruction from the main memory 102 or the cache memory 104. For example, if the specific compression ratio is 1/2 and the processing unit 108 outputs a binary instruction address 0100, the address converter 110 performs a shifting operation on the instruction address 0100 according to the compression ratio 1/2 such that the instruction address 0100 (corresponding to 4 in decimal) is converted into 0010 (corresponding to 2 in decimal). Please note, the ratio 1/2 is only utilized as an embodiment, not a limitation of the present invention. In the actual implementation, any other compression ratios (such as $1/2^n$) can be also used. These changes obey the spirit of the present invention.

However, if the compression ratio is not $1/2^n$, the address converter 110 needs to perform another logic operation, which may be more complicated than above-mentioned shifting operation. Here, the above-mentioned complicated logic operation can be easily derived by those skilled in the art, and thus omitted here.

In addition, in general, the size of an uncompressed block often utilizes a cache line as a unit. A cache line often comprises 4, 8, 16, or 32 instructions. Please note, in order to illustrate more simply, in the following disclosure, an uncompressed instruction block comprises 4 instructions.

Furthermore, although in the following embodiment, the instructions are compressed. But this is only regarded as an example, not a limitation of the present invention. In the actual implementation, those skilled in the art can utilize the present invention compression method to compress read-only data. This change also obeys the spirit of the present invention.

In the following disclosure, the method of compressing instructions according to the present invention will be illustrated. The compression of the instruction codes can be performed after a compiler/assembler compiles/assembles a high-level program codes into executable program codes. Please note, the above-mentioned execute program codes are often machine codes.

The operation of compressing instruction codes is often achieved through using an independent compression tool program to compress the compiled/assembled machine codes or using a compiler/assembler having the compression function to simultaneously compress the instruction codes when compiling/assembling program codes.

Figure 2:
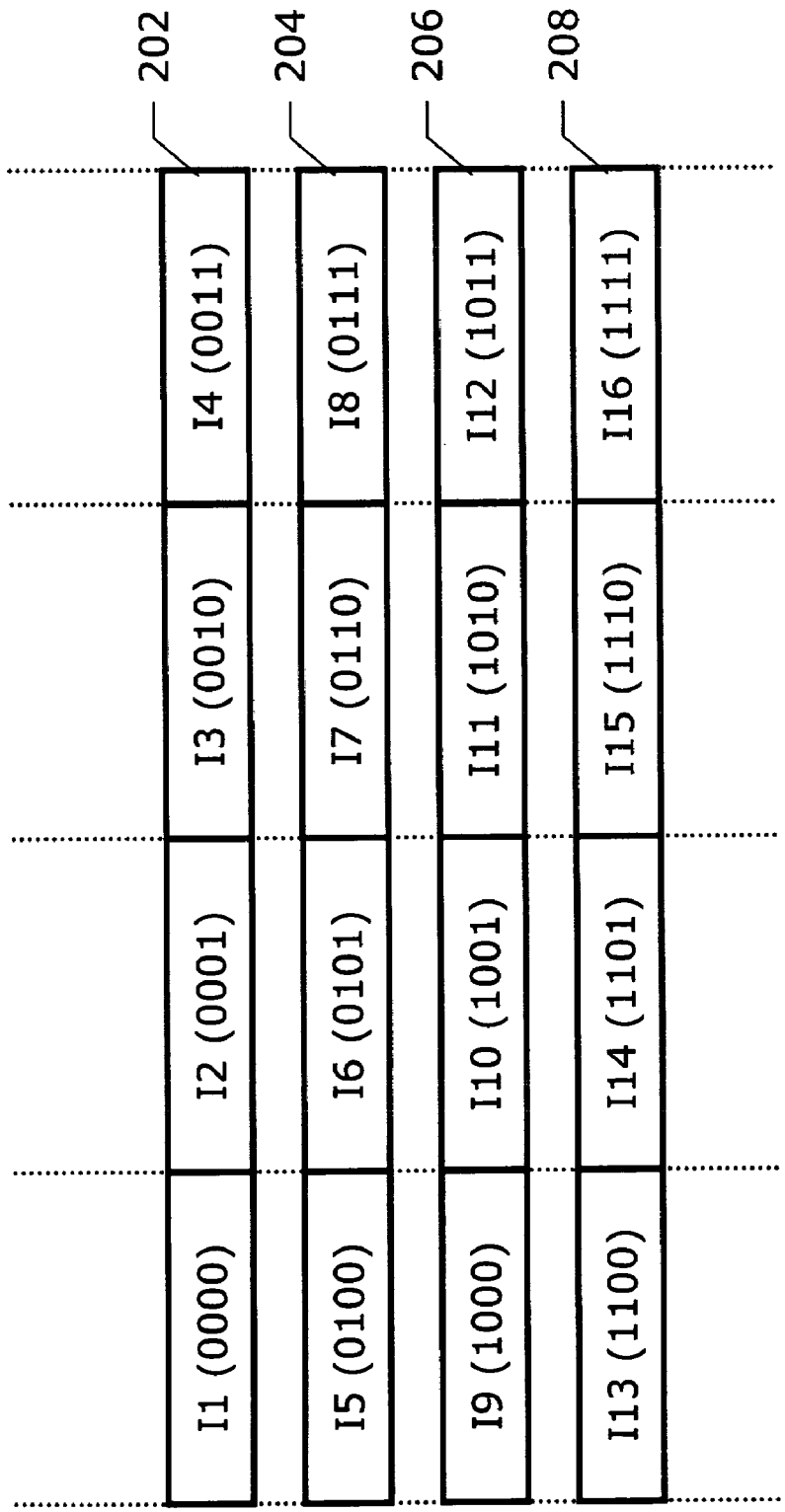
FIG. 2 is a diagram showing uncompressed instructions.

Please refer to FIG. 2, which is a diagram of instructions under the RISC structure. As shown in FIG. 2, each cache line comprises 4 instructions, where each instruction I1-I16 has the same length. Furthermore, the instructions I1-I16 are not specific RISC instructions. Please note, in this embodiment, four instructions correspond to an instruction block. For example, the instructions I1-I4, I5-I8, I9-I12, and I13-I16 respectively correspond to instruction blocks 202, 204, 206, and 208. However, this is only regarded as an embodiment, not a limitation of the present invention. For example, the instruction block can comprise $2^n$ instructions (such as 8, 16, or 32 instructions).

Please refer to FIG. 2 again, the RISC instructions I1-I16 have the same length and a simple format. This embodiment utilizes, but is not limited to utilize, Huffman Encode compression technique to compress the RISC instructions I1-I16. The compression technique performs the compression using the above-mentioned instruction block as a unit or using an instruction as a unit. And the compression result is shown in FIG. 3a.

Please note, other techniques capable of compressing the RISC instructions include Arithmetic Coding and etc can be also utilized. Since they are already known by those skilled in the art, further illustrations are omitted here.

Figure 3A:
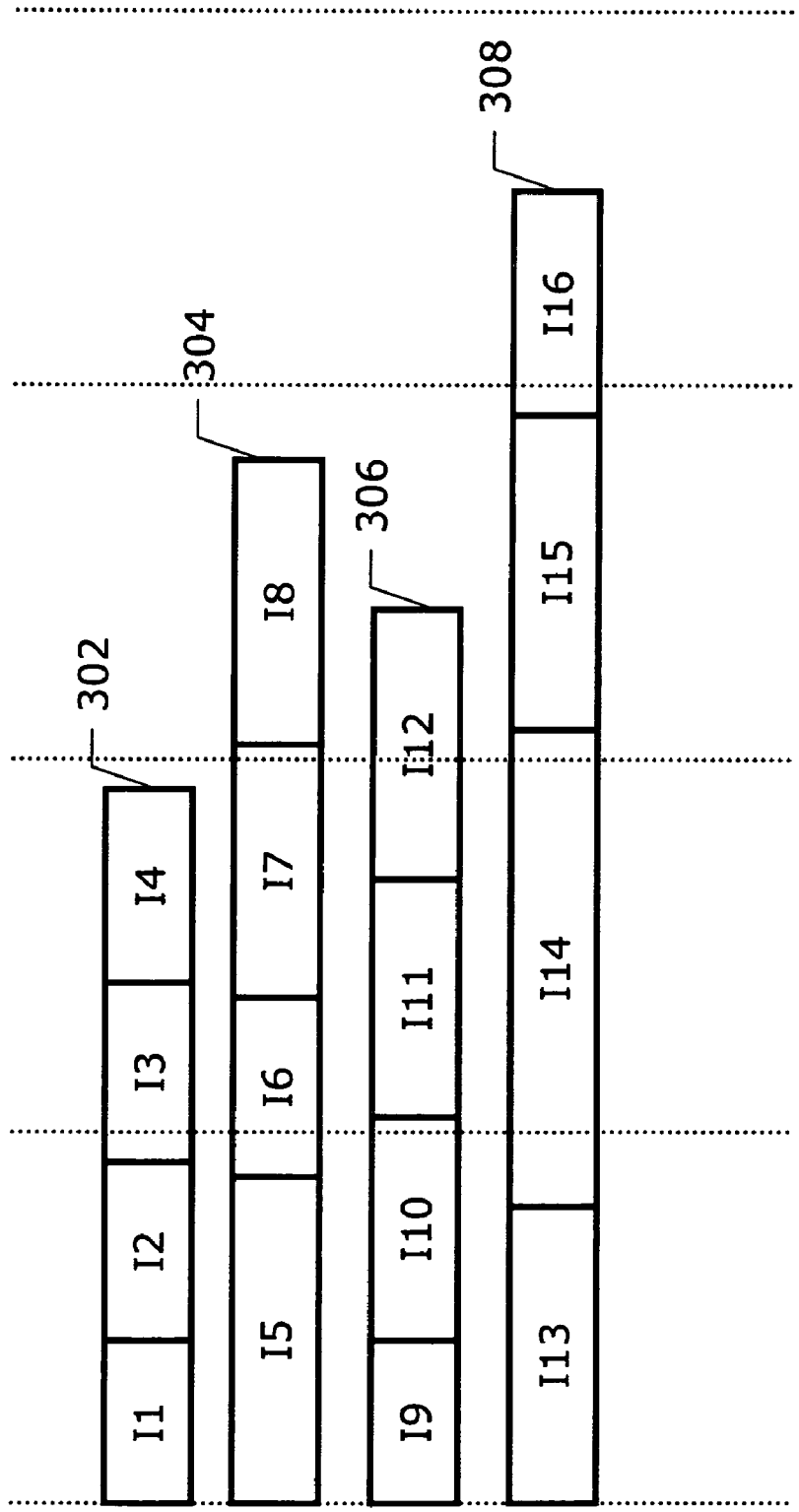
FIG. 3a is a diagram showing the instructions shown in FIG. 2 after compression.
Figure 3B:
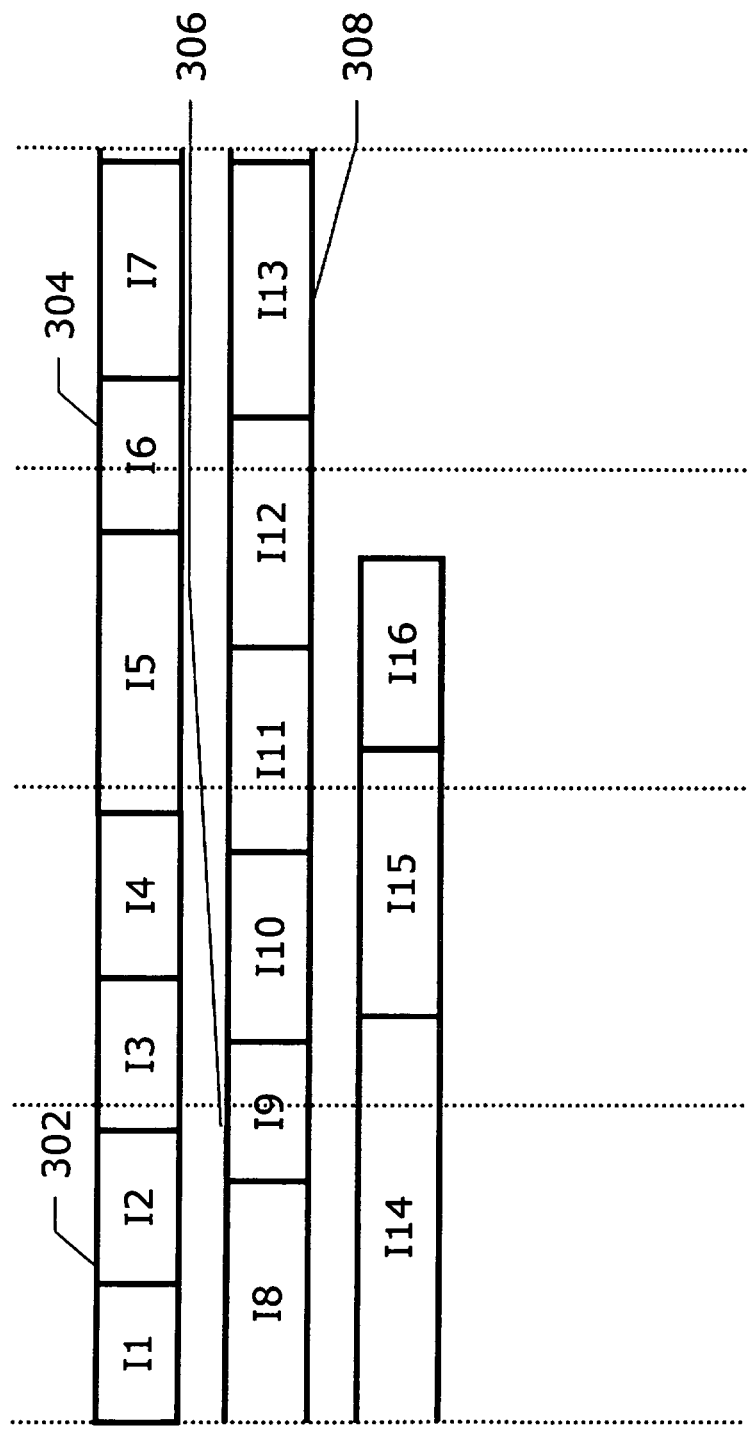
FIG. 3b is a diagram showing the compressed instructions shown in FIG. 3a are placed continuously.

In addition, as shown in FIG. 3a, different instruction blocks 302-308 respectively have different compression ratios. Therefore, if the compressed instruction blocks 302-308 are stored continuously according to the prior art in order to achieve the purpose of reducing the storage space, as shown in FIG. 3b, the initial positions of the instruction blocks 304-308 randomly locate in different addresses. Therefore, as mentioned previously, the prior art needs an index to provide corresponding relationships between the instruction addresses before compression and the instruction addresses after compression.

Figure 4:
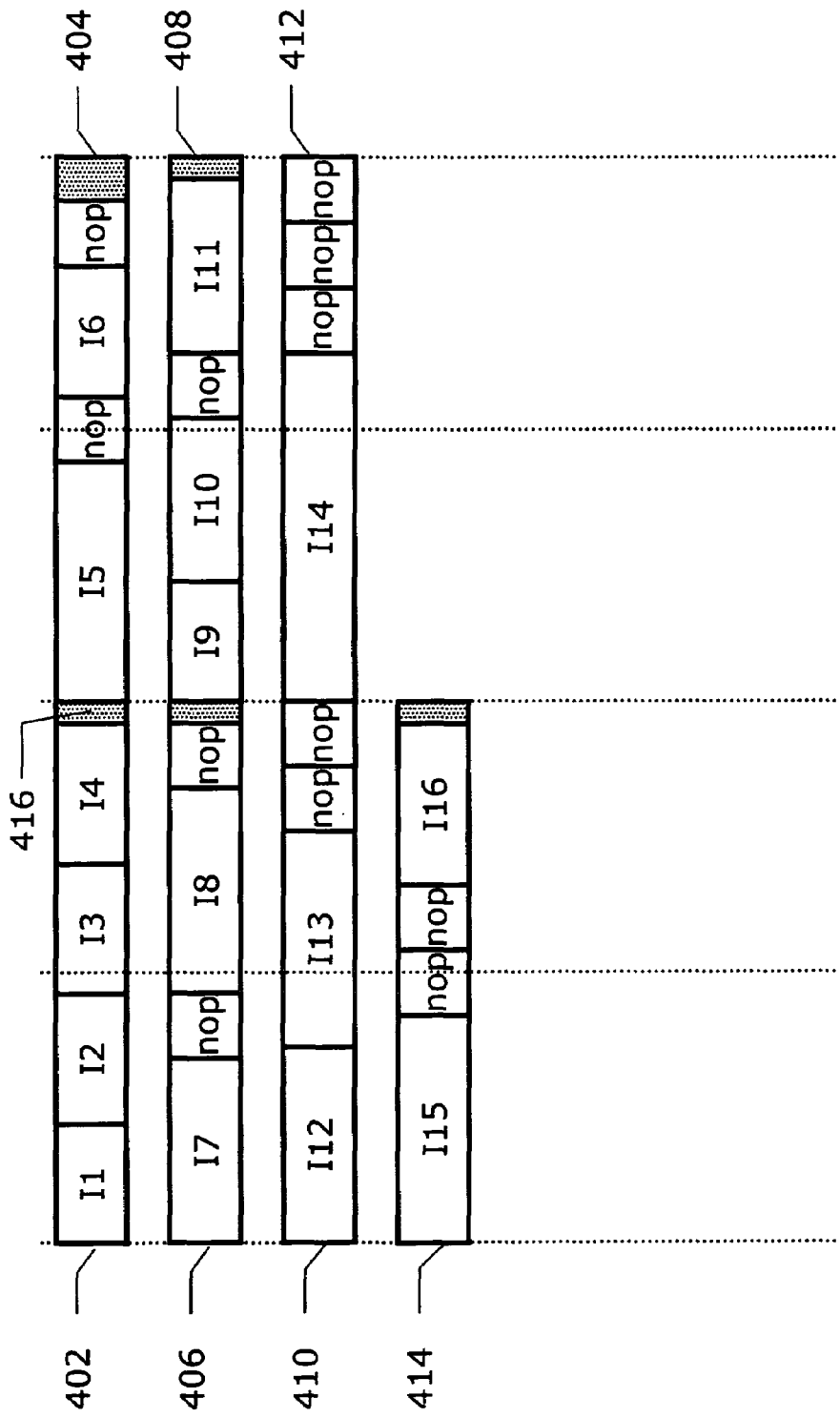
FIG. 4 is a diagram of compressed instructions according to the present invention.

Please refer to FIG. 4, in order to make the instruction address before compression and the instruction address after compression have predetermined relationships, the present invention inserts a compressed no operation (nop) instruction into the compressed instructions I1-I16 to form new instruction blocks 402-414. Or, the present invention can also insert uncompressed nop instructions into the uncompressed instructions I1-I16 and then compress the instructions to form the new instruction blocks 402-414. Please note, each instruction block 402-414 corresponds to a specific compression ratio. In this way, the address in each instruction block 402-414 can be determined according to the specific compression ratio and the number of inserted nop instructions.

In this embodiment, the above-mentioned specific compression ratio is 1/2. But it is not a limitation of the present invention, either. In the actual implementation, $1/2^n$ or other compression ratios can also be utilized. Furthermore, because the nop instruction under the RISC structure does not need to perform any operation, the codes of the nop instruction is very simple such that the nop instruction can have a very high compression ratio. Please note, in the above disclosure, the nop instruction is utilized, but it is not a limitation of the present invention. In the actual implementation, as long as an instruction has a high compression ratio and does not influence the correctness of the original program, the instruction can be utilized to replace the above-mentioned nop instruction.

Please refer to FIG. 4. As shown in FIG. 4, each cache line comprises two instruction blocks. Each instruction block comprises 4 instructions. And the instruction blocks 404-414 comprise the inserted nop instructions. Moreover, as shown in FIG. 3a, if the size of the instruction block, which is composed of 4 compressed instructions, is less than 1/2 of the uncompressed instruction block (such as the instruction block 302 composed of instructions I1-I4), there is no need to insert any nop instruction into the 4 instructions or to seperate the 4 instructions to form new instruction blocks.

But, if the originally-compressed 4 instructions cannot form an instruction block having a compression ratio 1/2 or less, the 4 instructions needs to be separated. The separated instructions are utilized with the nop instructions to form new instruction blocks. For example, the instruction block 304 composed of instructions I5-I8 is separated, and the separated instructions are respectively utilized to form new instruction blocks 404 and 406 with nop instructions as shown in FIG. 4.

In addition, if the 4 instructions of the new instruction block cannot fill with 1/2 storage space of the cache line (for example, the instruction blocks 402-408 and 414), one or multiple bits 416 can be added into the unfilled part of the instruction blocks. Please note, the above-mentioned bits 416 become don't-care bits after decompression operation.

Moreover, often when the program is being executed, the instructions are sequentially processed according to their addresses. But there is an exception. That is, when a branch instruction, a jump instruction, or a call instruction, which points towards a target address, is being executed, the program may jump to execute the instruction in the target address, and then sequentially execute the instructions from the target address. In this embodiment, in order to prevent from incorrectly executing the program, the above-mentioned target address, indicated by the branch instruction, jump instruction, or call instruction, is adjusted according to the number of inserted nop instruction.

Figure 5:
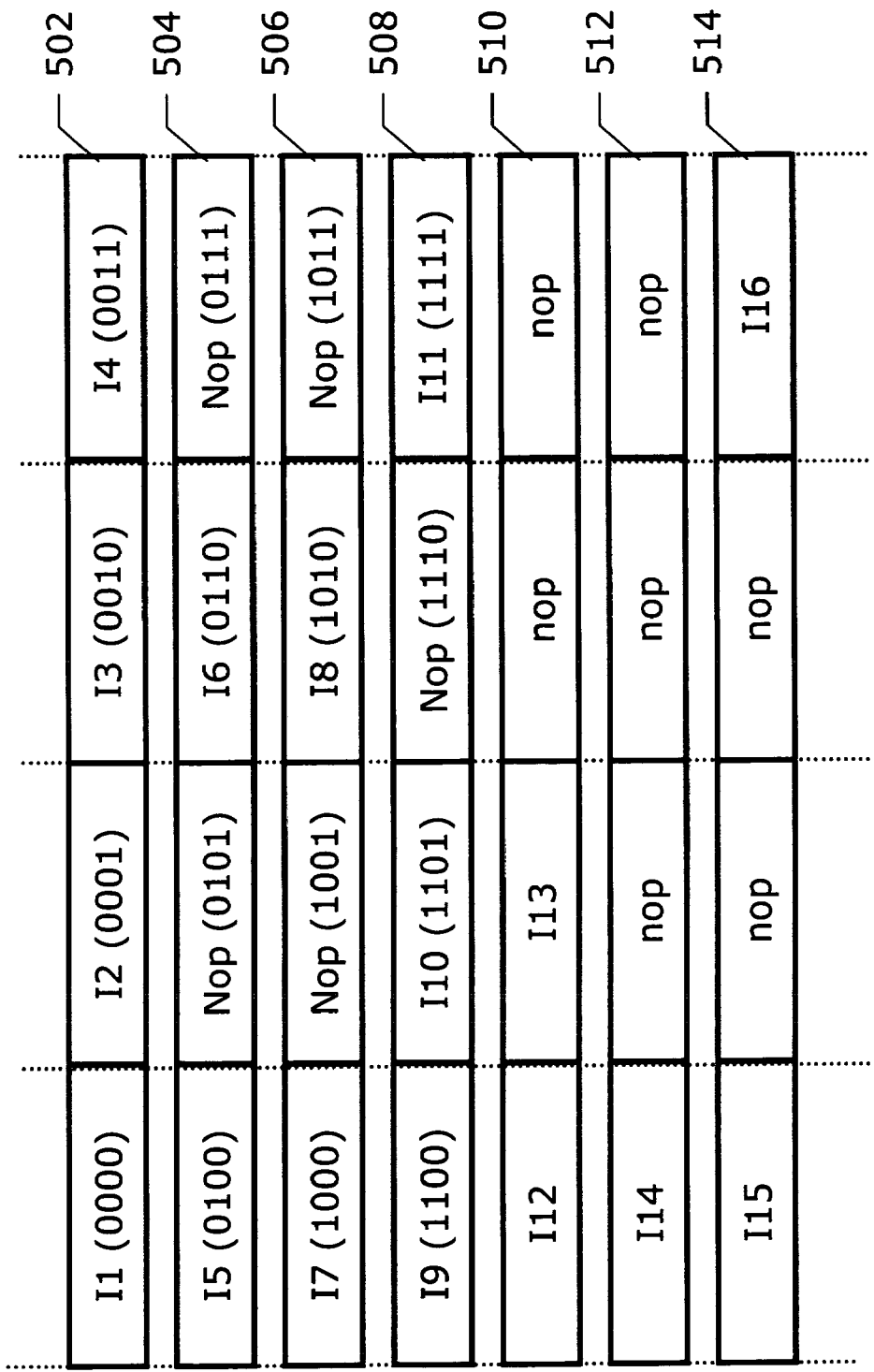
FIG. 5 is a diagram showing the instructions shown in FIG. 4 after decompression.

For example, please refer to FIG. 2 and FIG. 5, the uncompressed instruction I9 is the $9^{th}$ instruction, but the instruction I9 becomes the $13^{th}$ instruction after inserting the nop instructions, where the previous 13 instructions includes instructions I1-I9 and 4 nop instructions. Therefore, assume that the uncompressed instructions I1-I16 respectively correspond to binary addresses 0000, 0001, 0010, ..., 1110, and 1111, if the uncompressed instruction I1 points towards a target address 1000, in this embodiment, the present invention adds the number of the inserted nop instructions (in this embodiment, the number is 4), previous to the instruction I9, to the target address 1000. In this way, the target address 1000 is adjusted as 1100 such that the present invention can prevent from the errors due to incorrect target addresses.

In the following disclosure, how a computer system utilizes the compressed instructions according to the present invention will be disclosed. Please refer to FIG. 1 and FIG. 4, because the compressed instruction blocks 402-414 have a specific compression ratio (it is 1/2 in this embodiment), the address converter 110 can calculate a corresponding address in the main memory 102 or the cache memory 104 according to the address transferred from the processing unit 108. For example, when the processing unit 108 sends an instruction address 1100 (corresponding to the instruction I9 shown in FIG. 5), the address converter 110 performs the above-mentioned shifting operation on the instruction address 1100 according to the compression ratio 1/2 such that the instruction address 1100 is converted into 0110 (corresponding to the instruction I9 shown in FIG. 5). And then, the main memory 102 or the cache memory 104 provides all instructions of the cache line, in which the address 0110 is located, to the decompressing unit 106. The decompressing unit 106 then utilizes the decompression technique (such as Huffman Decode), which corresponds to the compression technique, to decompress every instruction, and provides the decompressed instruction corresponding to the address 1100 (the instruction I9 shown in FIG. 5). Therefore, the processing unit 108 can normally execute the decompressed instructions.

Moreover, in this embodiment, because the present invention utilizes the nop instructions having a very high compression ratio, this allows the new compressed instruction block still comprises four instructions and has the specific compression ratio 1/2. Therefore, the instruction addresses before compression and the instruction addresses after compression have corresponding relationships. When the program is being executed, an address converter can be utilized to perform a simple shifting operation such that a correct instruction address can be obtained. Furthermore, the insertion position of the nop instruction is not limited to be the back of the instruction block. In the actual implementation, the insertion positions can be freely selected as long as the accuracy of the program is still maintained. For example, the nop instruction can be inserted between two dependent or interlocked instructions or into the back of the multi-cycle instruction.

Figure 6A:
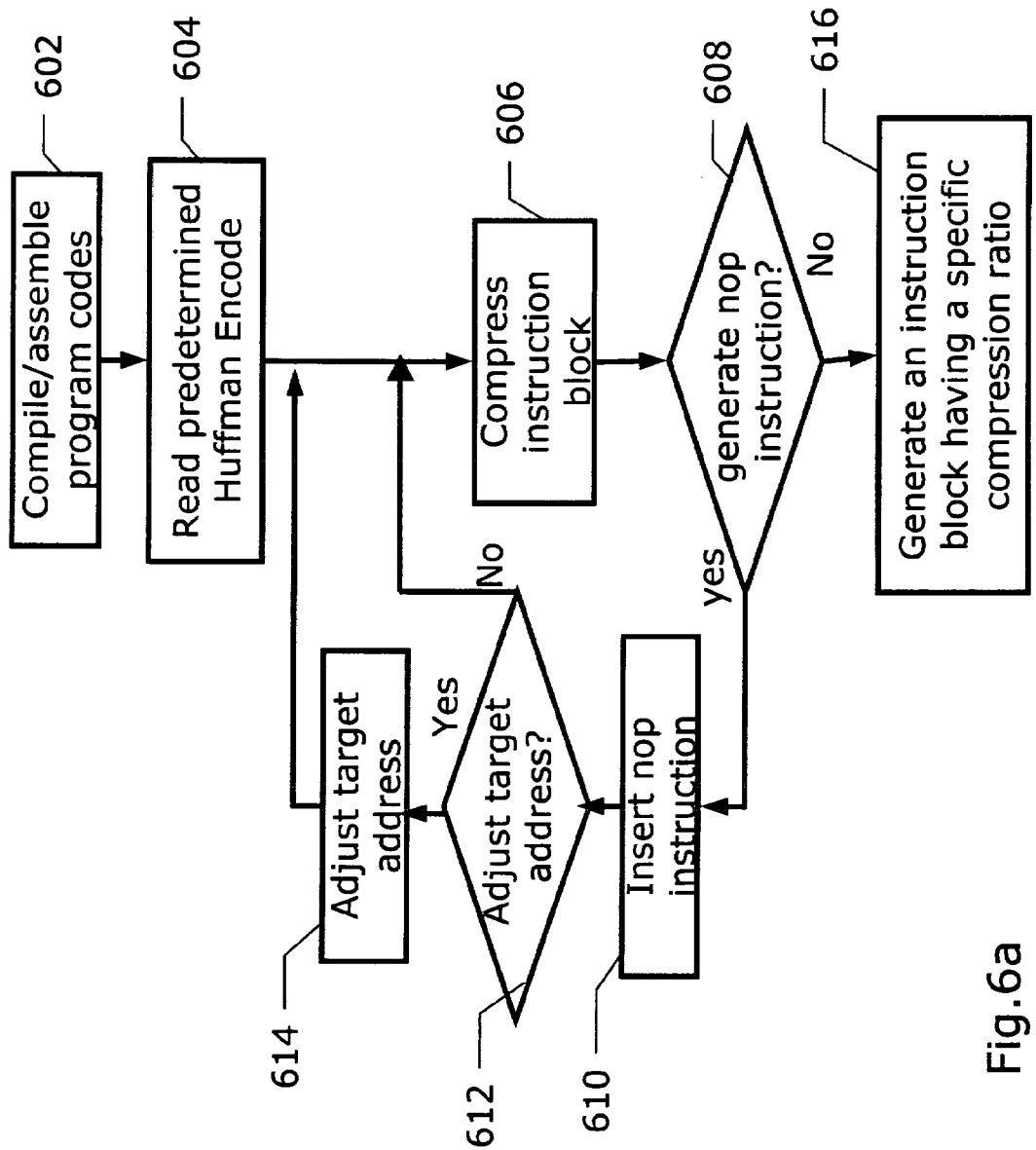
FIG. 6a is a flow chart of a compression method according to the present invention.

FIG. 6a is a flow chart of compressing the program codes. Please refer to FIG. 6a in conjunction with related illustrations for FIG. 3a and FIG. 4 to understand the steps in this flow chart.

Step 602: Utilize a normal compiler/assembler to compile/assemble a program into executable program codes of a computer system (which are often machine codes);

Step 604: Read predetermined Huffman Encodes. In this embodiment, the predetermined Huffman encodes can make the length of a compressed instruction less than 1/2 of the length of an uncompressed instruction block (make the length of the compressed instruction less than the length of an compressed instruction block);

Step 606: Compress the instruction block according to the Huffman encodes;

Step 608: Determine whether an nop instruction needs to be inserted into the compressed instruction block according to a specific compression ratio to form an instruction block having the specific compression ratio. If yes, then go to step 610; otherwise, go to step 616;

Step 610: Insert nop instructions into uncompressed instruction blocks to form new instruction blocks;

Step 612: Determine whether a target address in the instruction in the instruction block needs to be adjusted. If yes, then go to step 614; otherwise, go to step 606;

Step 614: Adjust the target address, which needs to be adjusted, and then go back to the step 606; and Step 616: Generate the compressed program codes having the specific compression ratio. Please note that one or more of the above-mentioned steps could be repeated to complete the entire compression procedure.

Please note, the step 610 can further count the inserted nop instructions to generate a count value. And the step 614 can adjust the target address according to the count value. In addition, the step 610 can add bits to the instruction block if the instructions in the instruction block cannot fill with the instruction block, where the bits become don't-care bits after decompression. Furthermore, in the step 612, the instruction, which points towards the target address, is not always located in the instruction block, which needs inserted nop instructions. For example, please refer to FIG. 3b and FIG. 4, if the instruction I1 with target address points towards the instruction I6 and in step 610, the nop instructions are inserted into the uncompressed instruction block 304 to form the new instruction block, the step 612 needs to adjust the target address in the instruction I1 inside the instruction block 302.

Figure 6B:
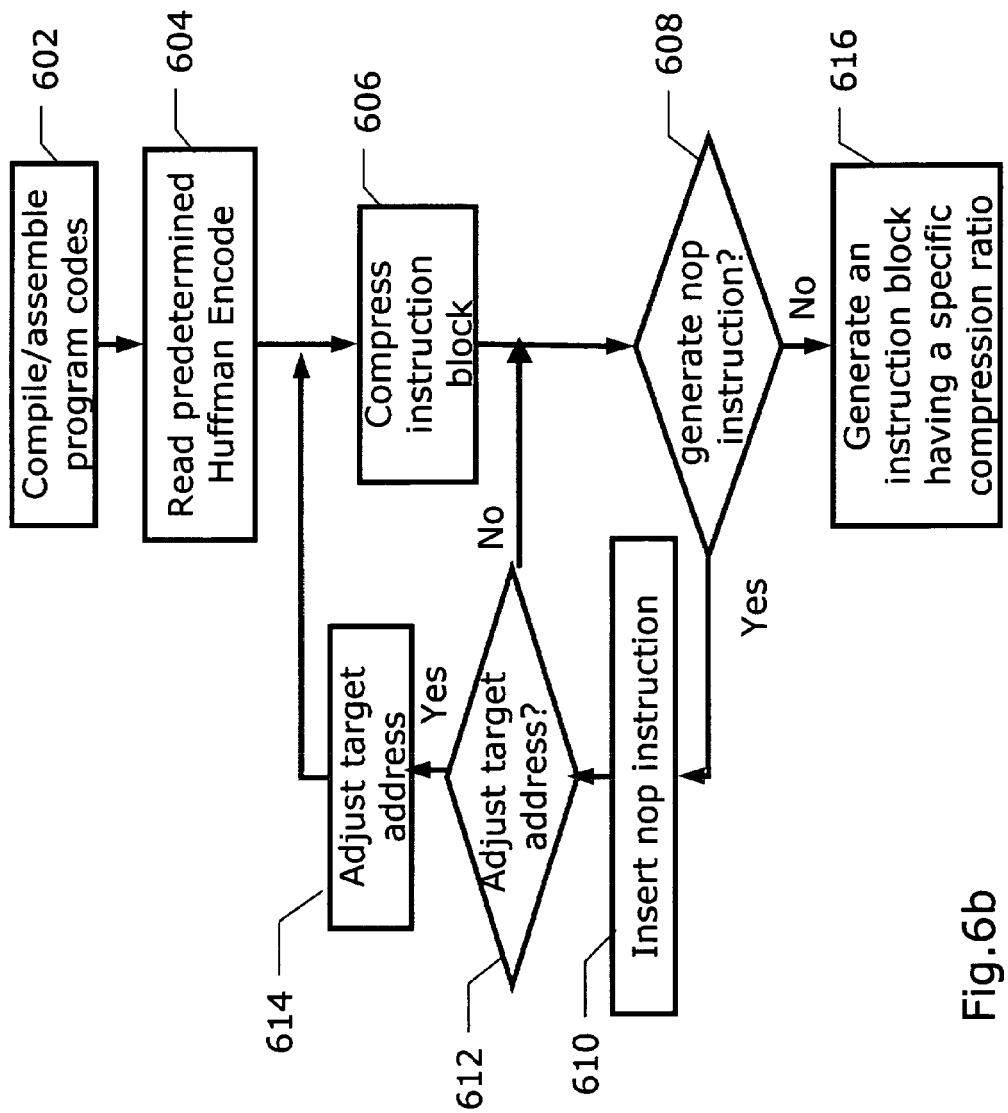
FIG. 6b is a flow chart of a compression method according to the present invention.

In addition, please refer to FIG. 6b, the step 610 can insert compressed nop instructions or bits into the back of the compressed instruction to form a new compressed instruction block. And then, if the step 612 determines that there is no other target addresses to be adjusted, the flow goes back to the step 608, otherwise, the flow goes to step 614.

Figure 7:
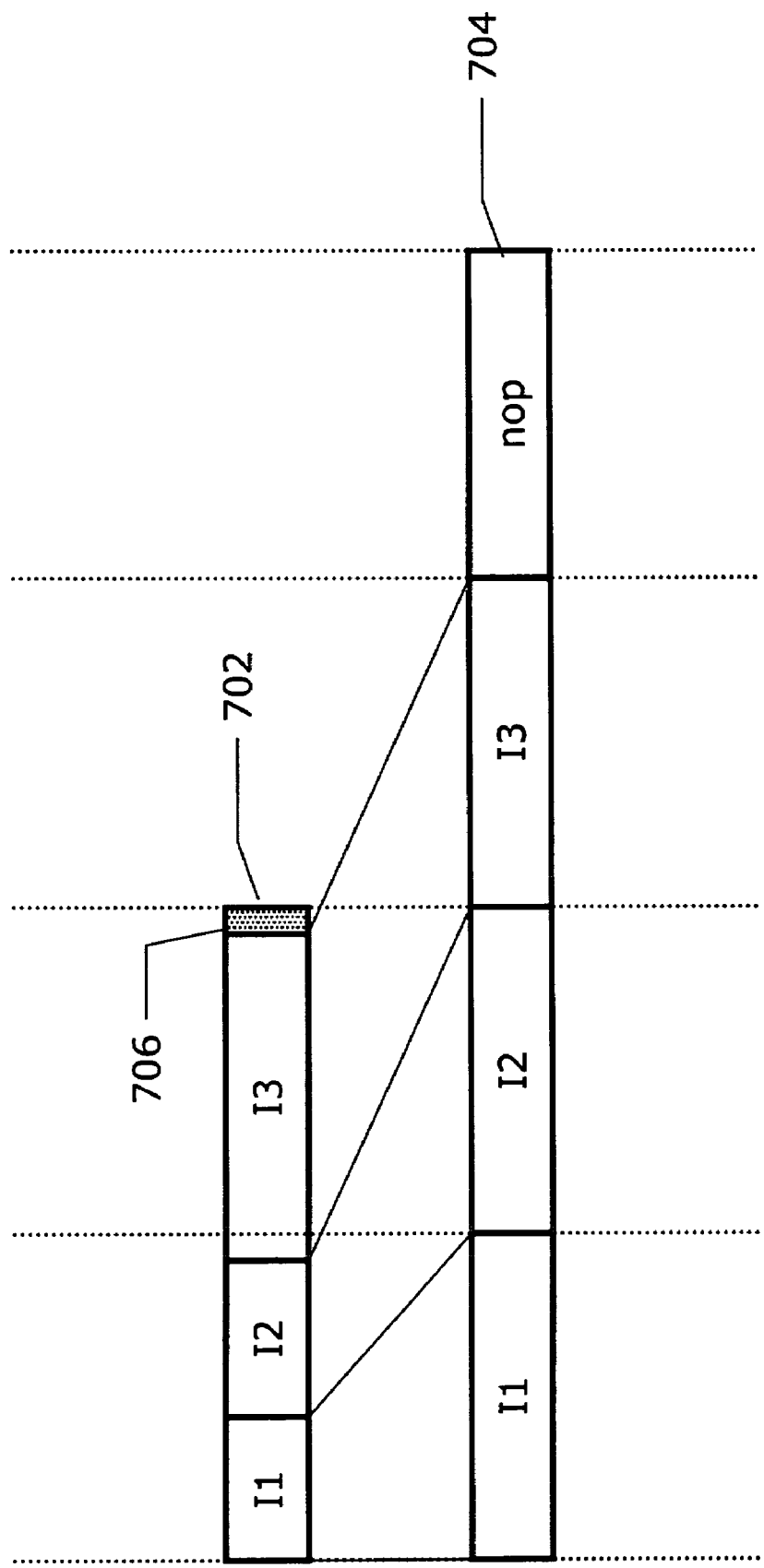
FIG. 7 is a diagram of compressed instructions of another embodiment according to the present invention.

Please refer to FIG. 7, which is a diagram of another embodiment according to the present invention. In the embodiment shown in FIG. 7, the present invention can utilize the n instructions, where the length of the n instructions is less than 1/2 cache line (the length of the instruction block when the specific compression ratio is 1/2), such as instructions I1-I3, to form a new instruction block 702. In this embodiment, n is an integer from 1 to 4, and when the length of the n instructions is not larger than 1/2 cache line, the n instructions are utilized with bits 706 to form the new instruction block. The difference between this embodiment and the above-mentioned embodiment is that this embodiment does not need to utilize nop instructions to form the new instruction block. However, in order to make each decompressed instruction block still comprise 4 instructions such that the address in each instruction can be calculated in a certain rule, in this embodiment, (4−n) instructions are added in the instruction block having n instructions when the instruction block is being decompressed.

For example, the instruction block 702 comprises 3 (n=3) instructions. Therefore, in this embodiment, when the instruction block 702 is being decompressed, one (4−3=1) nop instruction is inserted such that the instruction block 704 having 4 instructions can be obtained.

Figure 8A:
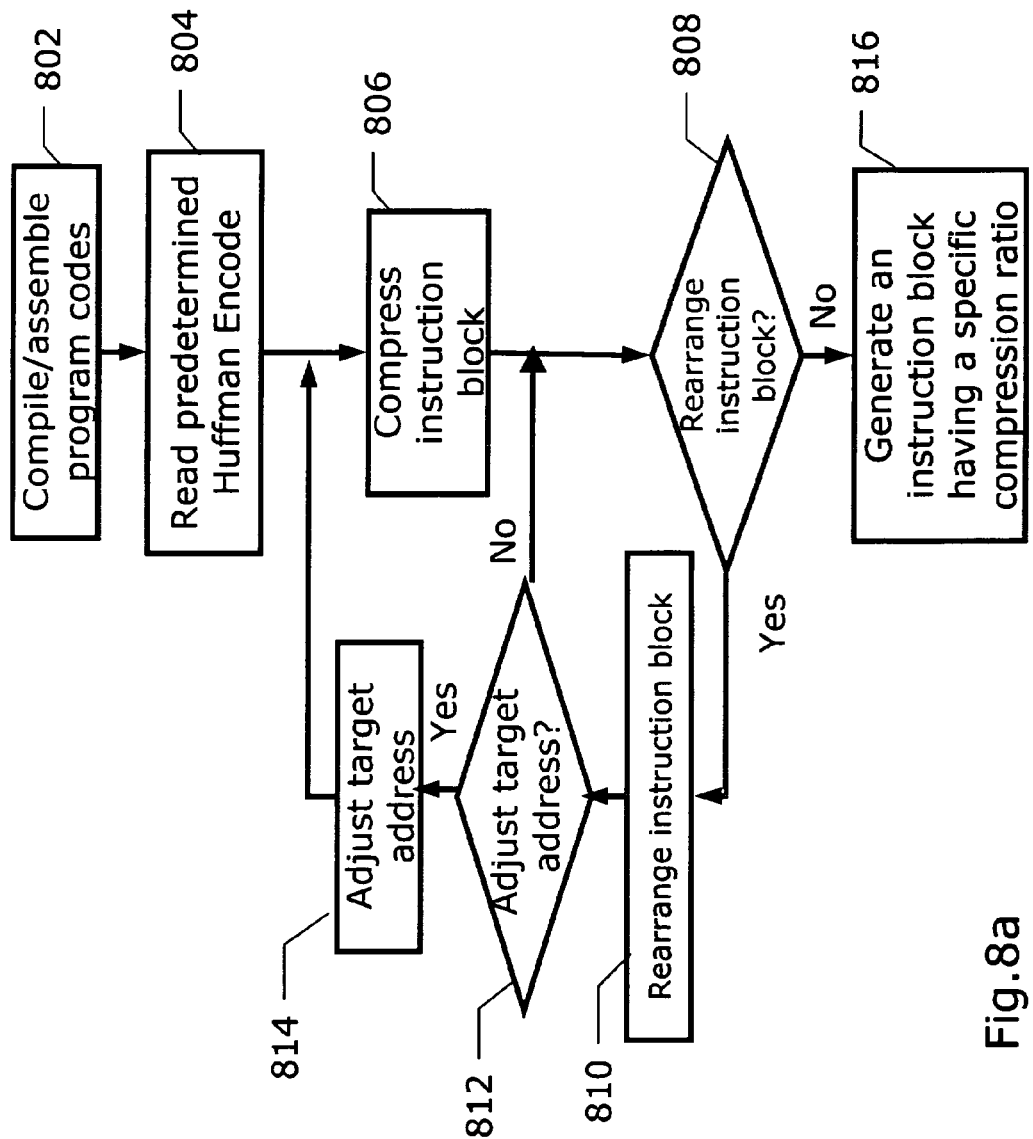
FIG. 8a is a flow chart of a compression method according to the present invention.

FIG. 8a is a flow chart illustrating the compression flow based on the embodiment shown in FIG. 7. It comprises following steps:

Step 802: Utilize a normal compiler/assembler to compile/assemble a program into executable program codes of a computer system (which are often machine codes);

Step 804: Read predetermined Huffman encodes. In this embodiment, the predetermined Huffman encodes can make the length of a compressed instruction less than 1/2 of the length of an uncompressed instruction block (make the length of the compressed instruction less than the length of a compressed instruction block);

Step 806: Compress the instruction block according to the Huffman encodes;

Step 808: Determine whether a compressed instruction block needs to be rearranged into a compressed instruction block having a specific compression ratio. If yes, then go to step 810; otherwise, go to step 816;

Step 810: Utilize the n compressed instructions, where the length of the n compressed instructions is less than the length of the compressed instruction block, to rearrange an instruction block (where n is an integer from 1 to 4)

Step 812: Determine whether a target address needs to be adjusted. If yes, then go to step 814; otherwise, go to step 806;

Step 814: Adjust the target address, which needs to be adjusted, and then go back to the step 806; and Step 816: Generate the compressed program codes having the specific compression ratio. Please note that one or more of the above-mentioned steps could be repeated to complete the entire compression procedure.

Figure 8B:
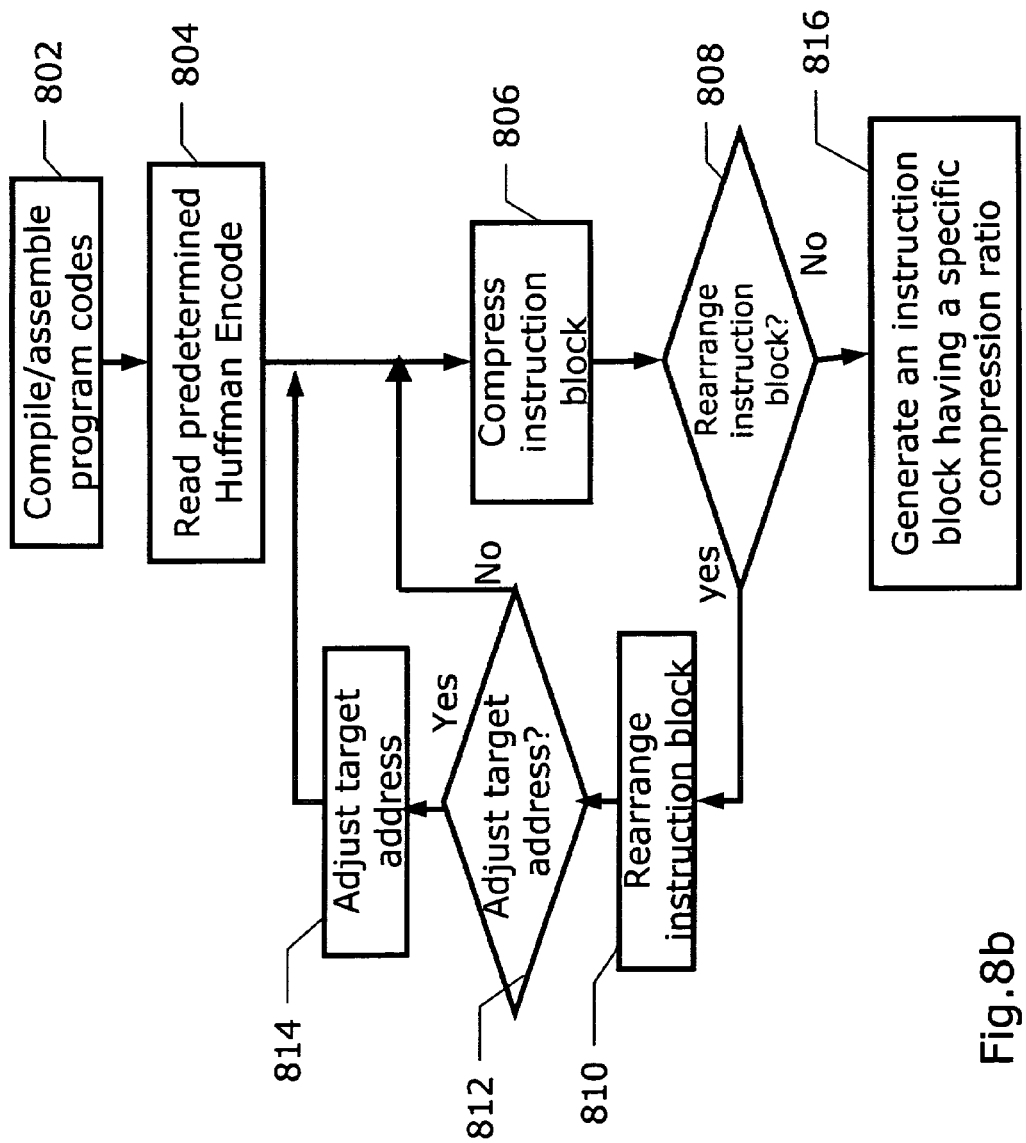
FIG. 8b is a flow chart of a compression method according to the present invention.

Please note, the step 810 can further calculate the value of (4−n) such that a count value is generated. And the step 812 adjusts the target address according to the count value. In addition, the step 810 can add bits to the instruction block to fill with the instruction block. Furthermore, please refer to FIG. 8b, the step 810 can also utilize uncompressed instruction to form a new instruction block. And then, if the step 812 determines that there is no need to adjust any target address, and the flow goes back to step 806, otherwise, the flow goes to step 814.

Figure 9:
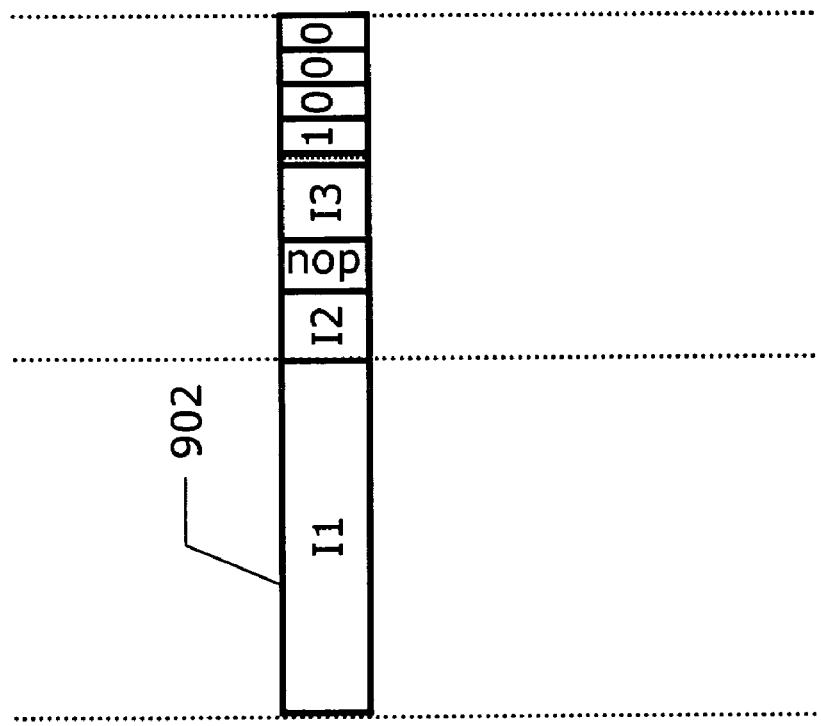
FIG. 9 is a diagram of compressed instructions of another embodiment according to the present invention.

In another embodiment of the present invention, when the length of a certain compressed instruction is larger than the length of the compressed instruction block or larger than the length of the uncompressed instruction, as shown in FIG. 9, this embodiment directly utilizes the instruction and other compressed instructions to form a compressed instruction block.

Please refer to FIG. 9, because the length of the compressed instruction I1 is larger than the length of the uncompressed instruction I1 (not shown), this embodiment utilize "uncompressed" instruction I1, compressed instruction I2, the nop instruction, and the instruction I3 to form a compressed instruction block 902. However, in order to make the decompressing unit perform the decompression operations only on the above-mentioned compressed instructions, in this embodiment, four bits at the end of the instruction block 902 are used, where each bit respectively corresponds to each instruction inside the instruction block 902. For example, assume that the bit value 1 represents that the corresponding instruction is not compressed and bit value 0 represents that the corresponding instruction is compressed. Therefore, for the above-mentioned four instructions inside the instruction block 902, the four bits respectively correspond to 1, 0, 0, and 0. They represent that only the first instruction I1 is not compressed among the four instructions I1, I2, nop, and I3. Through the above-mentioned mechanism, the decompressing unit 902 can know which instruction needs to be decompressed.

Figure 10:
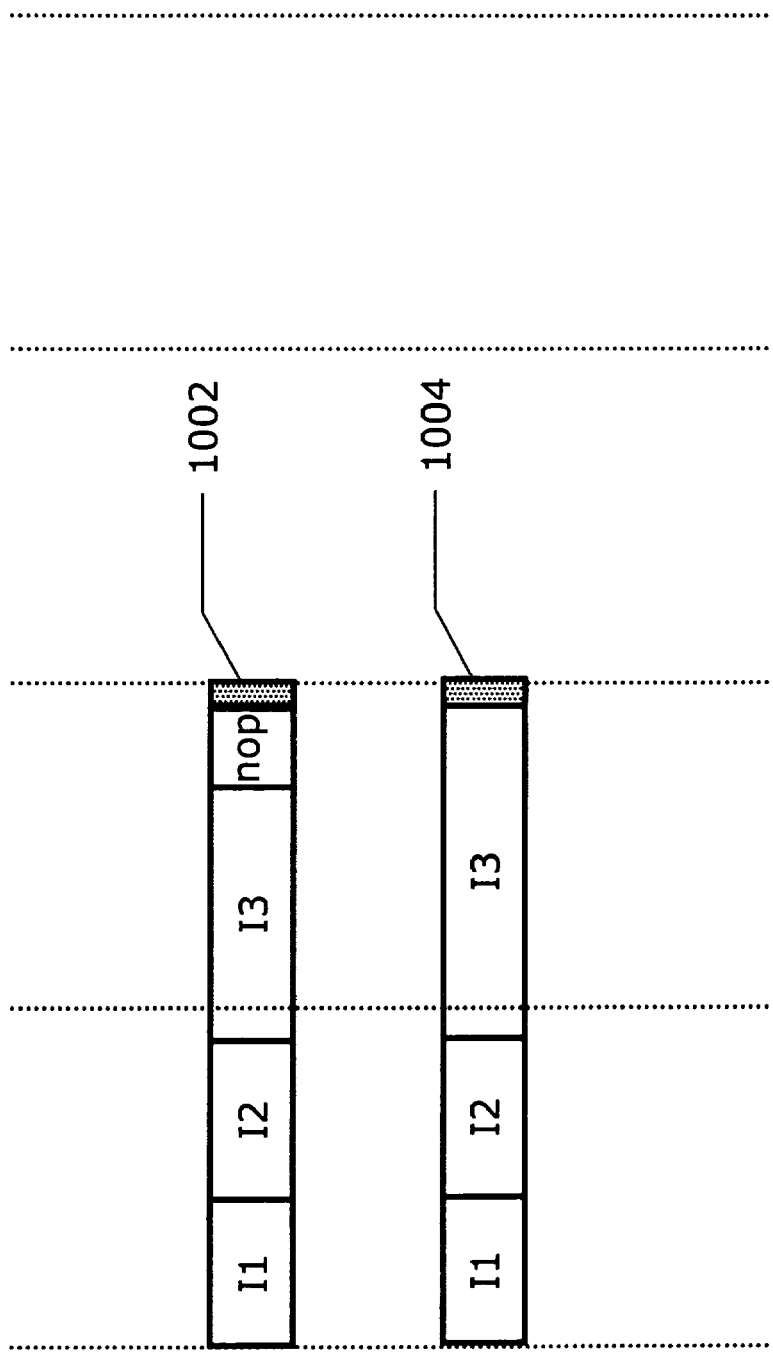
FIG. 10 is a diagram showing compressed instruction compressed by different compression methods according to the present invention.

Please note, the compression methods disclosed in the above-mentioned embodiments can be utilized to compress different instruction blocks according to a priority order. For example, as shown in FIG. 10, the present invention can determine whether the compressed instructions I1, I2, and I3 can form the instruction block 1002 having a specific compression ratio with the compressed nop instruction. If they can, the flow shown in FIG. 6a or FIG. 6b can be used to form the instruction block 1002, on the other hand, if they cannot, the present invention detects whether the 3 instructions I1, I2, and I3 can directly form the instruction block 1004, and then form the instruction block 1004 according to the flow shown in FIG. 8a and FIG. 8b. Moreover, the present invention compression method can be utilized to compress read-only data. The compression method of the data according to the present invention can be derived from the above-mentioned embodiments by those skilled in the art, and further illustrations are omitted here.

Furthermore, a program may comprise unnecessary instructions, such as inserted nop instructions or other removable instructions, which do not influence the accuracy of the program if they are removed. These unnecessary instructions may spend the processing time of the processing unit and reduce the efficiency of the entire computer system. Therefore, the present invention further discloses an apparatus and method of removing unnecessary instructions. And the embodiment thereof will be illustrated in the following disclosure.

Figure 11:
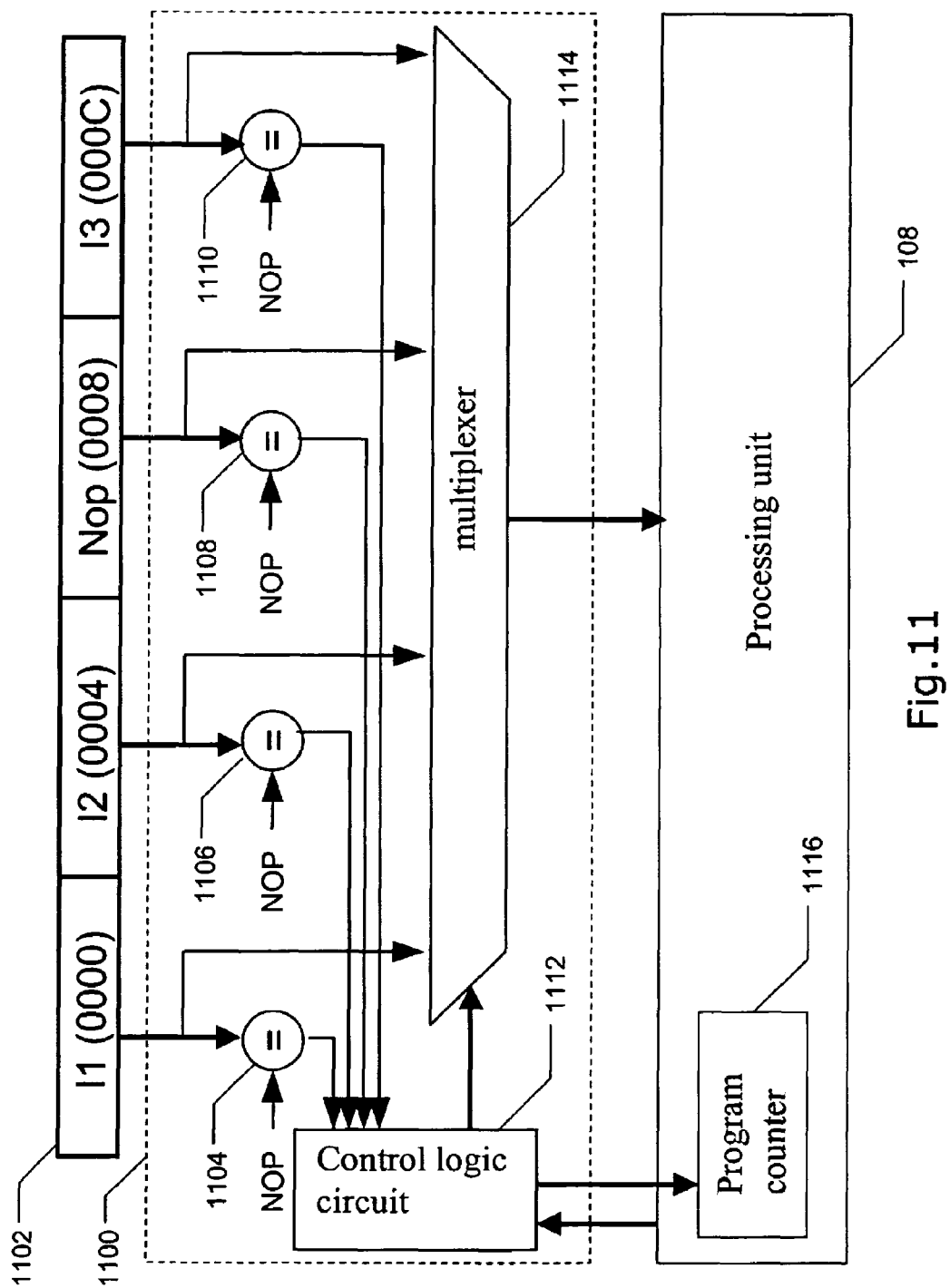
FIG. 11 is a diagram of an embodiment of an apparatus of removing unnecessary instruction according to the present invention.

Please refer to FIG. 11, which is a diagram of an apparatus of removing unnecessary instructions according to the present invention. As shown in FIG. 11, the removing circuit 1100 receives the instruction block 1102 and removes the nop instruction inside the instruction block 1102. The removing circuit 1100 comprises a plurality of comparing units 1104, 1106, 1108, and 1110, respectively for comparing each instruction I1, I2, nop, I3 with a predetermined pattern to generate a plurality of comparing signals. Please note, in this embodiment, the predetermined pattern is the nop instruction. But this is not a limitation of the present invention. In the actual implementation, the predetermined pattern can correspond to other above-mentioned removable instructions.

The removing circuit 1100 further comprises a control logic circuit 1112 for generating an instruction-selecting signal and a stride signal according to the plurality of comparing signals; and a multiplexer 1114, for receiving each of the instructions I1, I2, nop, I3 in the instruction block 1102 and selectively outputting at least one instruction to the processing unit 108 according to the instruction-selecting signal generated by the control logic circuit 1112. In this embodiment, only the comparing signal outputted by the comparing unit 1108 indicates that the predetermined pattern is equal to the compared instruction (the above-mentioned nop instruction). Therefore, the instruction-selecting signal informs the multiplexer 1114 according to the comparing signals to make the multiplexer 1114 output only the instructions I1, I2, and I3 without nop instruction.

The operations and functions of the above-mentioned comparing units 1104-1110, the multiplexer 1114, and the program counter 1116 are well-known by those skilled in the art, and thus omitted here. In addition, the control logic circuit 1112 can perform simple logic operations according to comparing signals outputted by the comparing units 1104-1110. Therefore, the structure of the control logic circuit 112 can easily be understood by those skilled in the art, and thus omitted here.

Moreover, because the removing circuit 1100 removes the nop instruction from the instruction block 1102. Therefore, in order to prevent the processing unit 108 from incorrectly regarding the instruction I3 as an instruction stored at the address corresponding to the removed nop instruction, the control logic circuit 1112 sends the above-mentioned stride signal to the program counter 1116 of the processing unit 108. In this way, the program counter 1116 generates a program counter stride (PC stride) according to the stride signal such that the processing unit 108 can process the instructions according to the addresses indicated by the PC stride.

For example, assume that each of the instructions I1 I2, nop, I3 inside the instruction block 1102 respectively corresponds to instruction addresses 0000, 0004, 0008, 000C in hexadecimal. When the comparing units 1104-1110 determines that the instruction I1 is not equal to the predetermined pattern, the instruction I2 is not equal to the predetermined pattern, the nop instruction is equal to the predetermined pattern, and the instruction I3 is not equal to the predetermined pattern, the control logic circuit 1112 orderly outputs a stride signal carrying PC strides +4 and +8 according to the comparing signals outputted by the comparing units 1104-1110. Therefore, the processing unit 108 can orderly process the instructions located on the instruction addresses 0000, 0004 (0000+0004=0004), and 000C (0004+0008) according to the PC strides +4 and +8. In this way, the processing unit 108 can process the instructions I1, I2, and I3 orderly and correctly.

In the above embodiment, the instructions I1 and I2 are sequential instructions, which are not equal to the predetermined pattern. Therefore, the PC stride between the instructions I1 and I2 is 4, which represents that after processing the instruction I1 located on the instruction address 0000, the processing unit 108 has to process the instruction I2 located on the instruction address 0004 according to the PC stride 4. However, because there is an nop instruction between the instruction I2 and the instruction I3 and the nop instruction is not inputted to the processing unit 108, the PC stride between the instructions I2 and I3 is 8, which represents that after processing the instruction I2 located on the instruction address 0004, the processing unit 108 has to process the instruction I3 located on the instruction address 000C according to the PC stride 8.

Similarly, if the instruction I2 is also an nop instruction, the control logic circuit 1112 sends a stride signal carrying the PC stride +12 to the program counter 1116 according to the comparing signals. Therefore, after processing the instruction I1 located on the instruction address 0000, the processing unit 108 processes the instruction I3 located on the instruction address 000C (0000+000C=000C) according to the PC stride +12.

In addition, if the instruction block 1102 occupies a cache line (that is, if a cache line comprises 4 instructions), the control logic circuit 1112 has to previously know whether the first instruction or the following instruction in the next cache line is an nop instruction. Because if the control logic circuit 1112 cannot previously know whether the first instruction or the following instruction in the next cache line is an nop instruction, the stride signal carrying correct PC strides cannot be generated. In other words, if the first instruction in the next cache line is not an nop instruction, the control logic circuit 1112 theoretically has to send a stride signal carrying PC strides +4, +8, and +4 to the processing unit 108. In this way, after processing the instruction I1 and processing the instructions I2 and I3 according to the PC strides +4 and +8, the processing unit 108 is able to process the first instruction of the next cache line according to the PC stride +4.

On the other hand, if the first instruction of the next cache line is an nop instruction but the second instruction of the next cache line is not an nop instruction, the control logic circuit 1112 theoretically has to send a stride signal carrying PC strides +4, +8, and +8 to the processing unit 108. In this way, after processing the instruction I1 and processing the instructions I2 and I3 according to the PC strides +4 and +8, the processing unit 108 is able to process the second instruction of the next cache line according to the PC stride +8.

In order to solve the above-mentioned problems, in this embodiment, the present invention discloses two solutions. The first solution is to make the processing unit 108 execute the first instruction of each cache line. If the first instruction is equal to the predetermined pattern (in this embodiment, the predetermined pattern is an nop instruction), the control logic circuit 1112 can correctly determine the PC strides carried by the stride signal to be sent.

On the other hand, the second solution is to pause the processing unit 108 until the comparing units 1104, 1106, 1108, and 1110 outputs the comparing signals of the next cache line and the control logic circuit 1112 outputs the stride signal according to the comparing signals.

In another embodiment of the present invention, there can be a plurality of predetermined patterns instead of only one predetermined pattern. When a certain instruction is compared with the plurality of predetermined patterns and is discovered that the certain instruction complies with one of the predetermined patterns, the certain instruction is not inputted to the processing unit 108 to process.

Furthermore, please refer to FIG. 11, when the instruction required by the processing unit 108 complies with a certain predetermined pattern, the control logic circuit 1112 control the multiplexer 1114 to output the instruction required by the processing unit 108 according to the instruction address information transferred from the processing unit 108. Therefore, the required instruction can be outputted to the processing unit 108.

Figure 12:
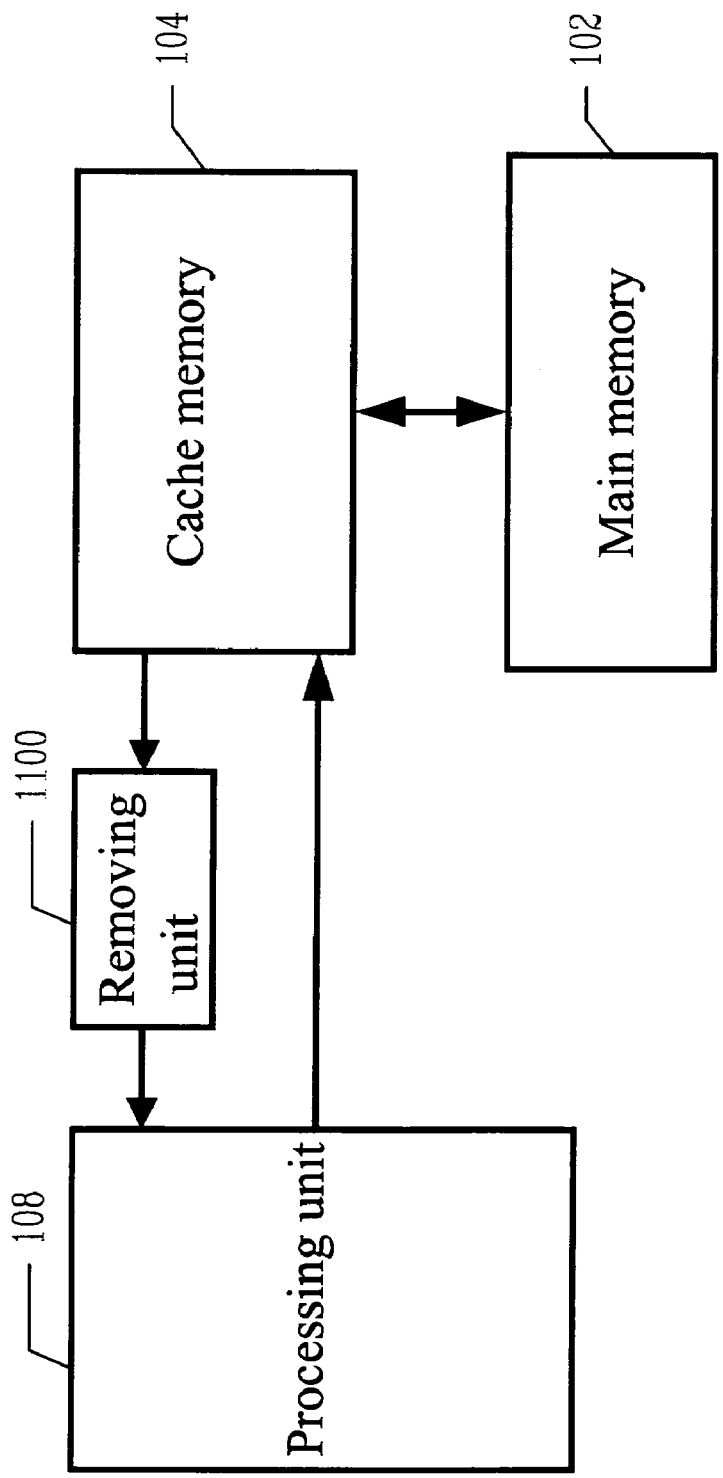
FIG. 12 is a diagram of an embodiment of a computer system comprising a removing unit according to the present invention.

Please refer to FIG. 12, which is a block diagram of an embodiment of a computer system 1200 comprising a removing unit 1100. As shown in FIG. 12, the removing unit 1100 is coupled between the processing unit 108 and the cache memory 104, When the processing unit 108 sends an instruction address to the cache memory 104 to request an instruction block corresponding to the instruction address, if the cache memory 104 stores the instruction block, the instruction block is processed by the removing unit 1100 and then transferred to the processing unit 108. On the other hand, if the cache memory 104 does not store the instruction block, the processing unit 108 bypasses the cache memory 104 and directly requests the main memory 102 to provide the instruction block. At this time, the instruction block is processed by the cache memory 104 and the removing unit 1100 and then provided to the processing unit 108. Please note, a decompressing unit can be added between the cache memory 104 and the removing unit 1100. The added decompressing unit can decompress compressed instructions and then outputs the decompressed instructions to the removing unit 1100 to process. Furthermore, the instruction address outputted by the processing unit 108 can be processed by an address converter and then transferred to the cache memory 104 or the main memory 102. These changes all obey the spirit of the present invention.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An apparatus for removing unnecessary instructions, the apparatus comprising:
    a comparing circuit, for comparing a plurality of instructions with at least one predetermined pattern to generate a plurality of comparing signals;
    a control logic circuit, for generating an instruction-selecting signal and a stride signal according to the plurality of comparing signals; and
    a multiplexer, for receiving the plurality of instructions and the instruction-selecting signal and outputting at least one of the plurality of instructions according to the instruction-selecting signal;
    wherein the control logic circuit outputs the stride signal to a processing unit, and the processing unit processes the instruction outputted by the multiplexer according to an address indicated by the stride signal.

2. The apparatus of claim 1, wherein the comparing circuit comprises a plurality of comparing units.

3. The apparatus of claim 1, wherein the predetermined pattern is an nop instruction.

4. The apparatus of claim 1, wherein the control logic circuit outputs the stride signal to a program counter of the processing unit.

5. The apparatus of claim 4, wherein the program counter changes at least one program counter stride (PC stride) according to the stride signal.

6. The apparatus of claim 5, wherein the processing unit processes the instruction outputted by the multiplexer according to the program counter stride.

7. The apparatus of claim 1, wherein when the comparing circuit determines that a first instruction of the plurality of instructions is not equal to the predetermined pattern, the multiplexer outputs the first instruction.

8. The apparatus of claim 7, wherein when the comparing circuit determines that a second instruction of the plurality of instructions is equal to the predetermined pattern; the multiplexer does not output the second instruction.

9. The apparatus of claim 1, wherein the instruction is an instruction under a reduced instruction set computer (RISC) structure.

10. A method for removing unnecessary instructions, the method comprising:
    comparing a plurality of instructions with at least one predetermined pattern to generate a plurality of comparing signals according to comparing results;
    generating an instruction-selecting signal and a stride signal according to the plurality of comparing signals; and
    outputting at least one of the plurality of instructions according to the instruction-selecting signal;
    wherein the stride signal is transferred to a processing unit, and the processing unit processes the instruction, outputted according to the instruction-selecting signal, according to an address indicated by the stride signal.

11. The method of claim 10, wherein the predetermined pattern is an nop instruction.

12. The method of claim 10, wherein the stride signal corresponds to at least one program counter stride (PC stride), and the processing unit processes the instruction, outputted according to the instruction-selecting signal, according to the program counter stride.

13. The method of claim 10, wherein when the step of comparing the plurality of instructions with the at least one predetermined pattern determines that a first instruction of the plurality of instructions is not equal to the predetermined pattern, the step of outputting the instruction according to the instruction-selecting signal outputs the first instruction.

14. The method of claim 13, wherein when the step of comparing the plurality of instructions with the at least one predetermined pattern determines that a second instruction of the plurality of instructions is equal to the predetermined pattern, the step of outputting the instruction according to the instruction-selecting signal does not output the second instruction.

15. The method of claim 10, wherein the instruction is an instruction under a reduced instruction set computer (RISC) structure.

16. A computer system capable of removing unnecessary instructions, the computer system comprising:

a main memory, for storing a plurality of instructions;

a cache memory, coupled to the main memory, for storing a plurality of cacheable instructions;

a processing unit; and a removing unit, coupled to the cache memory and the processing unit, for removing at least one unnecessary instruction among the instructions transferred from the cache memory to the processing unit according to at least one predetermined pattern the processing unit being arranged for receiving and processing an instruction transferred from the removing unit;

wherein the removing unit comprises:

a comparing circuit, for comparing instructions transferred from the cache memory with the at least one predetermined pattern to generate a plurality of comparing signals;

a control logic circuit, for generating an instruction-selecting signal and a stride signal according to the plurality of comparing signals; and a multiplexer, for receiving the instructions transferred from the cache memory and the instruction-selecting signal and outputting at least one of the instructions, transferred from the cache memory, according to the instruction-selecting signal;

wherein the control logic circuit outputs the stride signal to the processing unit, and the processing unit processes the instruction, outputted by the multiplexer, according to an address indicated by the stride signal.

17. The computer system of claim 16, wherein the instruction is an instruction under a reduced instruction set computer (RISC) structure.

18. The computer system of claim 16, wherein the predetermined pattern is an nop instruction.

19. The computer system of claim 16, wherein the control logic circuit outputs the stride signal to a program counter of the processing unit.

20. The computer system of claim 19, wherein the program counter changes at least one program counter stride (PC stride) according to the stride signal.

21. The computer system of claim 20, wherein the processing unit processes the instruction outputted by the multiplexer according to the program counter stride.

22. The computer system of claim 16, wherein when the comparing circuit determines that a first instruction of the plurality of instructions is not equal to the predetermined pattern, the multiplexer outputs the first instruction.

23. The computer system of claim 22, wherein when the comparing circuit determines that a second instruction of the plurality of instructions is equal to the predetermined pattern, the multiplexer does not output the second instruction.

* * * * *